INVENTOR.
ROBERT J. GELIN
BY
Staelin + Overman
ATTORNEYS

June 6, 1972 R. J. GELIN 3,667,891
MOLDING PRESS

Filed Aug. 13, 1969 2 Sheets-Sheet 2

INVENTOR.
ROBERT J. GELIN
BY
Staelin + Overman
ATTORNEYS

United States Patent Office 3,667,891
Patented June 6, 1972

3,667,891
MOLDING PRESS
Robert J. Gelin, Newark, Ohio, assignor to Owens-Corning Fiberglas Corporation
Filed Aug. 13, 1969, Ser. No. 849,671
Int. Cl. B30b 5/02; B29c 3/00
U.S. Cl. 425—408
5 Claims

ABSTRACT OF THE DISCLOSURE

A low-cost, high-speed press for molding plastic articles having a movable upper platen and a fixed lower platen with opposed matching dies attached thereto. The upper platen is moved between a remote upper position to a lower molding position at high speed by a motor-driven suspension system. When the upper platen is in the lower molding position, a plurality of platen stops are moved into locking position to prevent upward movement of the upper platen and molding force is applied by means of a fluid-filled pressure bag positioned between the die plates and one of the platens. The platen stops are adjustable in height to compensate for variable heights in the dies used with the press and vertical platen guides assure mold alignment throughout the range of movement by the upper platen.

BACKGROUND OF THE INVENTION

This invention relates to a low-cost, high-speed press for molding reinforced plastic materials, such as glass fiber-reinforced synthetic resin articles, in which the ultimate molding force is applied by means of a fluid-inflatable molding bag. More specifically, the invention relates to a molding press in which movement of the upper press platen from an upper remote position to a lower molding position is controlled by a high-speed mechanism operated independentliy of the fluid-inflated pressure bag, and in which removable mold or die plates may be attached to the opposed faces of the platens for molding different objects. The press is capable of handling molds having various depths or draws and can apply a wide range of molding forces by selecting a suitable fluid pressure to be supplied to the pressure bag which exerts the molding force.

Molding presses in which the molding pressure is applied upon the molded article by means of a fluid-inflated bag which is inflated between a pair of locked platens eliminate the need for expensive hydraulic controls. In such presses, such as those disclosed in U.S. Pats. 2,411,043, 3,135,998 and 3,152,364, the upper and lower platens are locked together and the entire vertical movement of the molds or dies is caused by the inflatable bag. These prior art presses have the disadvantage in that, if molds of various depths or draws are required, the length of the vertical movement may be excessive so that the time required to close the platen and apply molding pressure to the molded article is long and also the amount of inflation to effect such vertical movement may extend the inflatable bag beyond its desired shape. Because the molding force applied is a function of the area of the bag in contact with the opposed platen surfaces, over-inflation of the bag will necessarily reduce this area to require a higher pressure for a given force and also will stress areas of the bag not in contact with the platen faces.

U.S. Pat. 2,869,174 also discloses a fluid bag-operated press in which the bag, upper platen and upper mold or die are lowered into position by a mechanical means and, after latching the upper platen to the lower platen, bag pressure is supplied to apply the molding force. While a press of this type is useful in reducing the time necessary to lower the upper platen into molding position, it requires manual alignment of the upper and lower platens prior to latching, and will not accommodate molds of varying depths. In addition, due to the manner of positioning the bag within a pocket between the upper die and upper platen, this type of press does not present a large horizontal bag surface against the opposed die surface so that relatively high fluid pressures are required for a given molding force.

SUMMARY OF THE INVENTION

It is a primary object of this invention to provide a low-cost molding press which has none of the disadvantages enumerated above with respect to presses of the prior art. This is accomplished by means of a press having an upper and lower platform supported by a fixed frame in which a lower platen and its attached lower die rests upon the lower platform, and an upper platen is guided from an upper remote position to a lower molding position by means of guide bars fixed with relation to the lower platen so that the upper platen will be constantly guided in vertical alignment with the lower platen. The press also includes a provision for locking the upper platform in its lower, molding position so that when the fluid bag is inflated, further upward movement of the upper platen will be prevented so that the bag force is transmitted to the article being molded. The press also includes means for varying the vertical position of the platen locks so that dies or molds of varying depth or draw can be interchanged.

Other objects and advantages of the present invention will be apparent to those skilled in the art from a following detailed description of the preferred embodiment thereof, with reference being made to the accompanying drawings.

DESCRIPTION OF A PREFERRED EMBODIMENT

Figure 2:
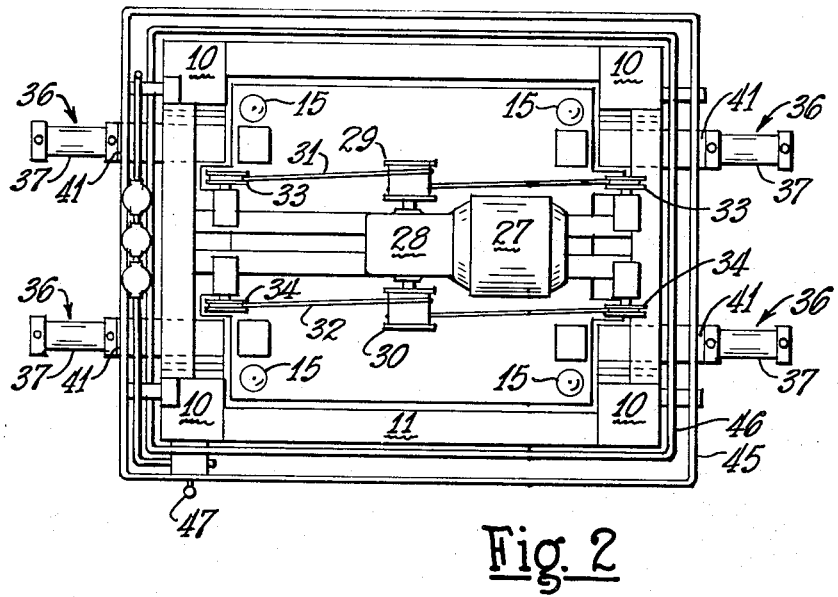
FIG. 2 is a plan view of the molding press shown in FIG. 1.
Figure 1:
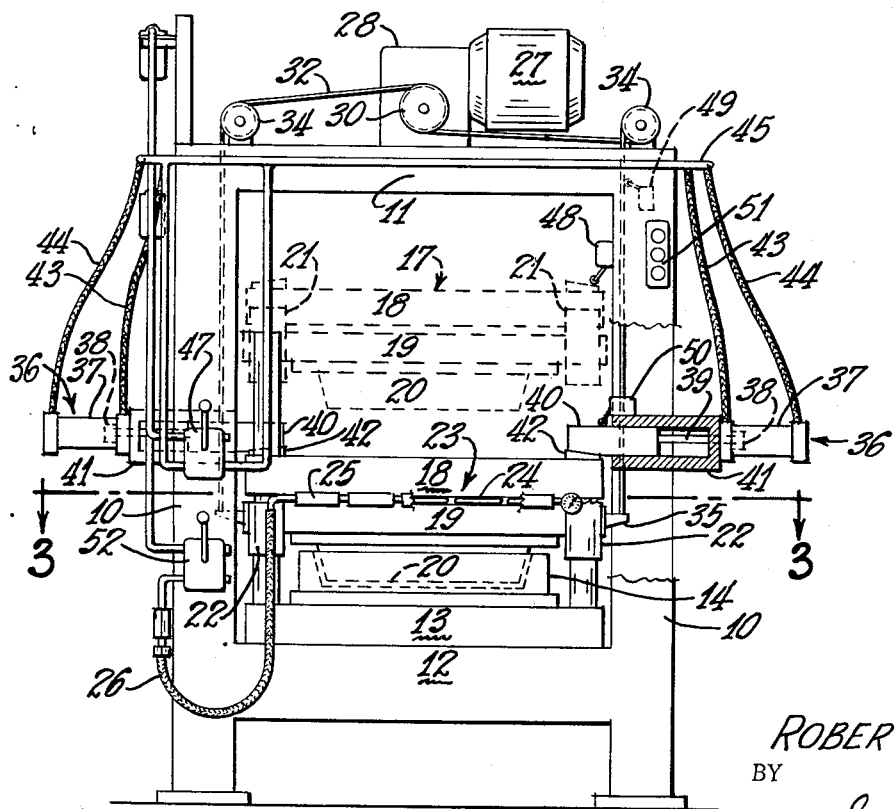
FIG. 1 is a view in elevation of the molding press of this invention showing the upper movable platen and its attached upper die in both its open, remote position and its closed, molding position.
Figure 4:
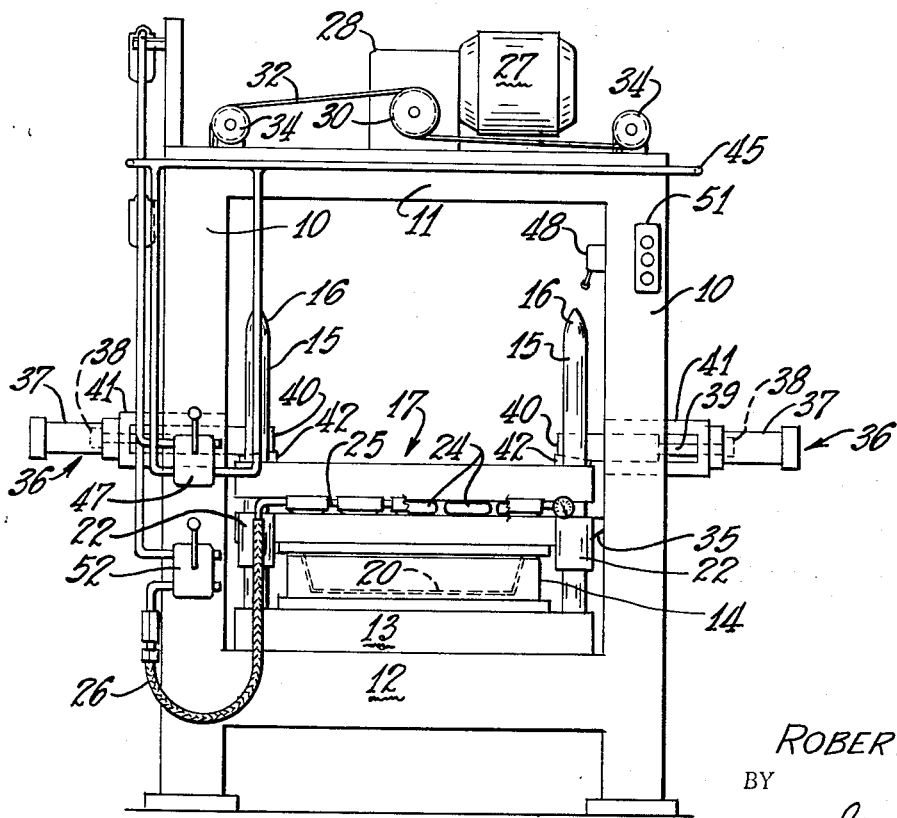
FIG. 4 is a view in elevation of the molding press, similar to FIG. 1 but showing the fluid pressure bag inflated to force the upper die against the lower die to mold an article therebetween.

Referring to FIGS. 1 and 2, a preferred embodiment of the molding press of this invention has a frame including four vertical supports 10 to which are secured a fixed, upper platform 11 and a lower platform 12. Resting upon the lower platform 12 is a lower platen 13 upon whose upper surface is secured the lower mold or die 14. Four vertically-extending guide pins 15 are secured to the lower platen 13 at the corners thereof and extend upwardly towards the upper platform 11. As best seen in FIG. 4, the tops of the guide pins 15 may terminate in a point or ogive 16 which assists in repositioning an upper platen, generally designated by reference numeral 17, if it is raised above the tops of the guide pins 15.

The upper platen 17 includes an upper bolster plate 18 and an upper platen plate 19 to which is attached the upper mold or die half 20 in alignment with the lower die half 14. As previously stated, the press of this invention is designed to accommodate a plurality of various types of die halves so that the upper and lower die halves 14 and 20 are removably secured in a conventional manner to their respective platens 13 and 19. In addition, it should be noted that the horizontal area of the platens 13 and 17 is sufficient to accommodate large sized dies so that standard dies may be interchanged without necessity of any special design which might be necessary to accommodate the vertically-extending guide pins 15 which are positioned at the corners of the lower platen 13.

Extending through the bolster plate 18 and upper platen plate 19 are four openings 21 positioned to receive the vertically-extending guide pins 15 so that, as the upper platen 17 is lowered towards the lower platen 13, vertical alignment of the platens 13 and 17, and thus their associated dies 14 and 20, is maintained. It will be understood by persons skilled in the art that appropriate indicia upon the platen faces can be used to position the die halves 14 and 20 to assure proper mating when the platens 13 and 17 approach one another. The openings 21 are defined by sleeves 22 which are secured to the upper platen plate 19 and extend through cylindrical passages in the bolster plate 18 so that the sleeves 22 can move vertically relative to the bolster plate 18.

Figure 3:
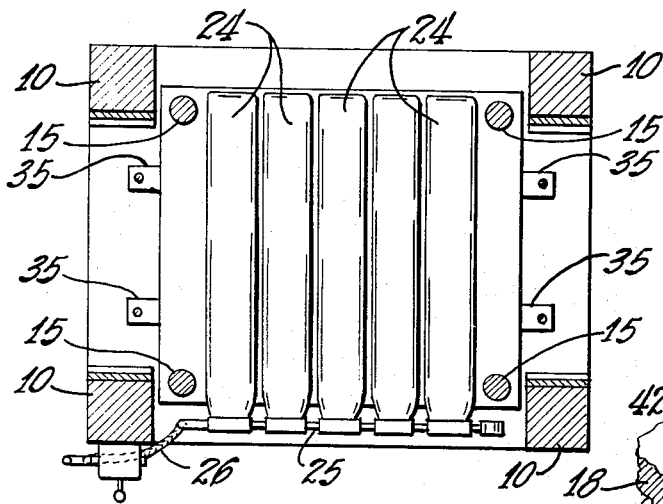
FIG. 3 is a cross-sectional view in plan, taken along line 3—3 of FIG. 1 and showing the details of the fluid-inflatable bag used to apply the molding pressure.

Positioned between the opposed surfaces of the bolster plate 18 so that the sleeves 22 can move vertically relabag, generally designated by reference numeral 23 and best seen in FIG. 3, which consists of a plurality of parallel flat tubes 24 of a reinforced flexible material. The tubes 24, as shown in FIG. 3, are completely closed at their upper ends and have their lower ends connected to a common air manifold 25 so that air pressure supplied to the manifold 25 through an air supply line 26 will inflate the tubes under equal pressure. As seen in FIG. 1, with the tubes 24 of the air bag 23 in uninflated position, they lie flat between the bolster plate 18 and upper platen plate 19 so that their horizontal surface area adjacent these two plates is substantially equal to the horizontal area of the plates 18 or 19. Because the force applied to the molded material is a product of the air bag pressure times the area in contact, a larger contact area requires less air pressure for a given force, as will be subsequently explained.

The mechanism for raising and lowering the upper platen from an upper remote position, as shown in phantom in FIG. 1, to a lower molding position, as shown in solid line in FIG. 1, consists of a cable suspension system including an electric motor 27 secured upon the upper platform 11 with an appropriate gear reduction box 28 having a pair of cable drums 29 and 30, as seen in FIG. 2. Suspension cables 31 and 32 are wound upon the drums 29 and 30, respectively, and extend over pulleys 33 and 34, respectively, positioned at the corners of the upper platform and downwardly within the press frame. The ends of cables 31 and 32 are secured to a dog 35 which extends outwardly from each of the sleeves 22 secured to the upper platen 19. When the electric motor 27 turns the drums 29 and 30 on the gear box 28, in either direction, cables 31 and 32 will be wound or unwound to raise or lower the entire upper platen 17 as it is guided by the guide pins 15 from its upper remote position, as shown in phantom in FIG. 1, to its lower molding position, as shown in full line in FIG. 1.

Secured to an inner face of each of the vertical supports 10 is a platen lock mechanism, generally designated by reference numeral 36, which, as best seen in FIG. 1, includes an air cylinder 37 containing a piston 38 which is connected through a piston rod 39 to a wedge-shaped stop member 40. The stop member 40 is guided in its horizontal movement by a slide 41 and is adopted to move within the slide 41 from a remote or open position clear of the path of vertical movement of the upper platen 17 to a closed position. In its closed position, the stop member 40 extends over a wedge-shaped seat 42 secured to the upper surface of the bolster plate 18, as shown in FIG. 1.

A pair of air lines 43 and 44 from an air header 45 supply air to each end of the air cylinder 37 so that pressure selectively applied to either of the air lines 43 or 44 will move the piston 38 and thus the stop member 40 between its open and closed position. The air supply lines 43 or 44 of their respective platen locks 36 are connected to a common air header 45 or 46, which headers are in turn connected through an air control valve 47 which is manually operated to supply air selectively to either header 45 or 46 so that each of the platen locks 36 are moved simultaneously together with the others from their open to remote positions.

The press of the preferred embodiment described includes a number of electrical or pneumatic controls for limiting the vertical movement of the upper platen 17 and controlling the movement of the platen locks 36. These controls are schematically shown and are briefly described as follows.

A first limit switch 48 is secured to the frame above the upper remote position of the upper platen 17 and is interconnected in the power supply to the electric motor 27 so that, when the upper platen 17 reaches its uppermost position, as shown in phantom in FIG. 1, the first limit switch 48 is opened to disable the motor 27 and to prevent further upward movement.

A second limit switch 49 is secured to the frame with its movable arm in contact with the cable 32 supporting a portion of the upper platen 17, as shown in FIG. 1. The limit switch is interconnected with the power supply to the electric motor 27 so that when the upper platen 17 is moving downwardly to a molding position adjacent the lower platen 13, continued movement of the cable 32 will slacken the cable 27 to open the second limit switch 49 to stop further rotation of the motor 27. The limit switch 49 could be placed adjacent the lower platen 13 but, if so positioned, would require adjustment in order to compensate for variable mold depths, as previously explained.

A third limit switch 50 is positioned on the frame adjacent one of the platen locks 36, as shown in FIG. 1, so that it is actuated by movement of the stop member 40 to its closed position. This third limit switch 50 is interconnected with the power supply of the motor 27 to disable the motor 27 when the stop member 40 is in its locked position so that the cable system cannot attempt to raise the upper platen 17 against the stop members 40.

Operation of the press thus described is as follows. Starting with the upper platen 17 in its upper remote position, as shown in phantom in FIG. 1, the sheet molding material or other molding compound is placed upon the lower die 14 on the lower platen 13 and the motor 27 is energized, by means of the control switch 51 shown in FIG. 1, to lower the upper platen 17 to its molding position, as shown in full line in FIG. 1. When the upper platen 17 reaches its molding position, as will be determined by its resting upon the material to be molded or by adjustable mold stops (not shown), the continued rotation of the motor 27 will cause the cable 32 to slacken, thus actuating the second limit switch 49 to shut off further movement of the cable system. At this time, the operator will manipulate the air control valve 47 to apply air pressure through the air lines 44 which will cause the stop members 40 to move to their closed position, as shown in FIGS. 1 and 4. The operator will next move an air control valve 52 to admit air under pressure to the supply line 26 to the air bag 23 which will inflate each of the air tubes 24 positioned between the bolster plate 18 and upper platen plate 19. Inflation of the tubes 24, as shown in FIG. 4, will force the upper platen 19 and its associated die half 20 downwardly upon the molding material to apply the proper molding force thereto. As previously stated, the proper molding force is a function of the pressure supplied to the air tubes 24 and the area of surface contact with the tubes. A simple pressure adjustment valve can be included in the air supply system to the air bag so that the desired amount of molding force can be obtained for any type of molding material and configuration of the die.

After the molding force has been applied and held for a sufficient time, the operator then switches the air control valve 52 to its other position to release the pressure from the air tubes 24, and the stop members 40 are retracted to their remote positions by movement of the air valve 47 to supply air to the pistons 38 through the supply lines 43. The upper platen 17 is then raised by the motor 27 and its associated controls towards its upper remote position. When the upper platen 17 reaches its upper position, it contacts the first limit switch 48 to stop the motor control from further movement. In this upper position, the molded part is unloaded and the new supply of molding material is placed upon the lower die and the process is repeated.

Figure 5:
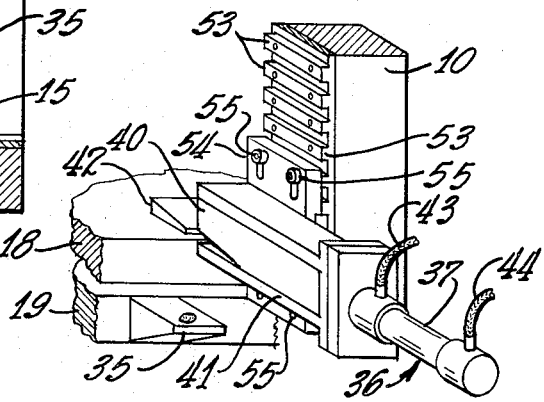
FIG. 5 is a view in perspective of one of the platen locking devices which, when actuated, prevents upward movement of the upper platen from its lower molding position.

As previously explained, one of the advantages of the present invention is that it can be used to accommodate a series of different molds or dies in which the depth of the draw or height of the article to be formed is varied. This is accomplished through the use of adjustable platen locks 36 which can be positioned at differing elevations along the frame of the press. The means for adjustably positioning the platen locks 36 is illustrated in FIG. 5, which shows a portion of one of the vertical supports 10 with a plurality of stepped teeth 53 extending vertically along its length. The slide 41 holding the stop member 40 and air cylinder 37 is secured to a plate 54 whose inner surface has correspondingly-shaped teeth which interlock with the teeth 53 on the vertical support 10. One or more threaded screw members 55 are provided to secure the plate 54 at the desired elevation on the vertical support 10. The operator, when changing from one set of molds to another, need only reposition the four platen locks 36 at the desired height on the vertical supports 10 and then the molding operation can automatically proceed as previously described.

The preferred embodiment of the invention thus described has the advantages of a fluid bag molding press of the type previously used in the prior art in that it eliminates the relatively high cost of hydraulic controls necessary to supply high molding forces. The press of the instant invention has the further advantage in that it is adapted to accommodate molds of various designs and depths, will move the upper platen at high speed from its upper remote position to its lower molding position, and will maintain the platen in vertical alignment with the lower platen at all times during this high-speed movement. The press of the instant invention also includes the aforementioned safety features which prevent the unintentional actuation of the high-speed upper platen control when the platen locks are actuated, and further includes a simple pressure regulator control for selectively varying the molding force upon the objects to be molded. Other advantages of the invention will be apparent to those skilled in the art, and and various modifications thereof may be made without departing from the scope of the following claims.

I claim:

1. A molding press for plastic articles comprising, in combination, a fixed lower platform surrounded by a plurality of vertical supports which extend upwardly and terminate in a fixed upper platform, a fixed lower platen adjacent said fixed lower platform with a lower mold resting upon said lower platen, a movable upper platen positioned within said vertical supports and supporting on its lower surface an upper mold in vertical alignment with said lower mold, said upper platen and mold being slidably associated with said vertical supports and movable in a vertical direction from an upper open position adjacent said upper platform to a lower closed position, a plurality of suspension cables secured to said upper platen and extending upwardly to said upper platform, motor means for paying out or winding up said suspension cables whereby movement of said upper platen and mold between their upper open and lower closed position is controlled solely by said motor means, a plurality of platen locks adjustably secured to said vertical supports, each of said platen locks having an engaged position which prevents passage of said upper platen and a retracted position laterally remote from the vertical path of said upper platen with means securing said platen locks to said vertical supports being selectively adjustable such that the vertical position at which they interfere with movement of said upper platen can be selected, whereby said platen can be moved at high speed from its said open to its said closed position and whereby said platen locks can be selectively engaged to interfere with movement of said upper platen at a selected height above said lower platen.

2. The molding press of claim 1 wherein said means securing said platen locks to said vertical supports comprises a plurality of stepped teeth extending vertically along said vertical supports and at least one complementarily shaped tooth on the adjacent surface of said platen locks whereby said tooth and teeth can be interlocked together at a selected position along said vertical support.

3. The molding press of claim 1 which further includes a control mechanism carried by one of said platen locks and operably connected to said motor and effective to disable said motor only when said platen locks are in engaged position.

4. The molding press of claim 3 wherein said control mechanism carried by said platen lock is a limit switch for sensing the condition of said platen locks and effective to disable said motor only when said platen locks are in engaged position.

5. The molding press of claim 1 which further includes a fluid pressure expansion member positioned between one of said platens and its associated mold, said expansion member having a deflated state and a state of vertical expansion whereby, when said molds are in closed position with said platen locks in engaged position to prevent further retraction of said movable upper platen, fluid pressure applied to said expansion member urging it towards its said expanded state will force said molds together.

References Cited

UNITED STATES PATENTS

| | | | |
|---|---|---|---|
| 2,363,779 | 11/1944 | Duffy et al. | 18—17 E UX |
| 2,717,421 | 9/1955 | Beeson | 18—17 C |
| 2,869,173 | 1/1959 | Van Hartesveldt et al. | 18—16 H |
| 3,089,188 | 5/1963 | Hoffman | 18—16 C |
| 3,135,998 | 6/1964 | Fowler, Jr., et al. | 18—19 P |
| 3,191,235 | 6/1965 | Rougement | 18—16 C X |
| 3,195,186 | 7/1965 | Gauban et al. | 18—30 LA X |
| 3,242,533 | 3/1966 | Wintriss | 18—16 C |
| 3,262,158 | 7/1966 | Von Reimer et al. | 18—30 LA |
| 3,309,739 | 3/1967 | Trueblood | 18—30 LA |
| 2,739,749 | 3/1956 | Davidson | 100—269 A UX |
| 3,262,164 | 7/1966 | Meves | 164—341 |
| 3,465,386 | 9/1969 | Brown | 18—30 L A |
| 3,353,221 | 11/1967 | Barnett et al. | 18—43 |

ROBERT L. SPICER, JR., Primary Examiner

U.S. Cl. X.R.

100—219, 269; 425—Dig. 19, 411, 390, 450